United States Patent
Siddall

[11] 4,065,224
[45] Dec. 27, 1977

[54] TWIST DRILLS

[75] Inventor: Keith Siddall, Sheffield, England

[73] Assignee: Osborn-Mushet Tools Limited, Sheffield, England

[21] Appl. No.: 730,442

[22] Filed: Oct. 7, 1976

Related U.S. Application Data

[63] Continuation of Ser. No. 579,085, May 19, 1975, abandoned.

[30] Foreign Application Priority Data

May 17, 1974 United Kingdom ............... 22130/74

[51] Int. Cl.² .............................................. B23B 51/00
[52] U.S. Cl. .................................................... 408/230
[58] Field of Search ............... 408/227, 228, 229, 230

[56] References Cited

U.S. PATENT DOCUMENTS

| | | | |
|---|---|---|---|
| 262,588 | 8/1882 | Hartshorn | 408/230 |
| 1,309,706 | 7/1919 | Taylor | 408/230 |
| 2,328,629 | 9/1943 | Eich et al. | 408/230 |
| 2,778,252 | 1/1957 | Oxford, Jr. | 408/230 |
| 2,966,081 | 12/1960 | Kallio | 408/230 |
| 3,443,459 | 5/1969 | Mackey et al. | 408/230 |

Primary Examiner—Harrison L. Hinson

[57] ABSTRACT

A twist drill the cross-sectional shape of which is such that, although it can be sharpened on a conventional machine so that its cutting edges are contained in the surface of an imaginary cone, its cutting edges are curved and their lip rake is substantially constant radially outwards of the drill core.

6 Claims, 5 Drawing Figures

TWIST DRILLS

This is a continuation of application Ser. No. 579,085, filed May 19, 1975 now abandoned.

The invention relates to twist drills and has for its object to provide an improvement therein. In particular, it is the object of the invention to provide a twist drill which will have a longer life between re-grinds than a twist drill of conventional form.

It is usual to design the cross-sectional shape of a twist drill in such a way that, having a particular helix angle and a particular point angle its cutting edges will be straight. Thus, in a drill having a conventional helix angle and a conventional point angle this has necessitated the cross-sectional shape of the drill being concave in the surfaces of the drill faces. However, experiments have previously been carried out to determine the effect of reducing the point angle of a conventional helix angle drill, for example to as little as 60°, and in some circumstances it is found that there are certain advantages in this. On the other hand it has been found that by reducing the drill point angle the strength of the chisel edge across the web or core thickness has been reduced, so much so that for heavy duty use it has been found necessary to provide the drill with a compound point angle, that is to say, to grind the point at the chisel edge to an angle in the region of the conventional point angle. A further result, following from the relationship between the conventional cross-sectional shape of the drill, the conventional helix angle and the reduced point angle, has been that the cutting edges have been curved, although of course contained in the surface of an imaginary cone.

A drill geometry has also been developed utilizing a conventional cross-sectional shape ground to conform substantially to the shape which a conventional drill assumes when it becomes excessively worn, that is to say considerably worn away in the region of the outer corners so that the cutting edges are no longer contained in the surface of an imaginary cone but are curved by grinding on a special machine. However, although such a drill form has been found to have certain advantages, notably in the fact that wear has been distributed evenly along the cutting edges instead of being concentrated in the regions of the outer corners, re-grinding has been very difficult and expensive.

According to the invention, there is provided a twist drill having a cross-sectional shape which is convex in the surfaces of the drill faces so that, having a conventional helix angle, that is to say between 25° and 45°, and being sharpened at a conventional point angle between 90° and 150°, the cutting edges are curved but contained in the surface of an imaginary cone. Preferably, in a drill intended primarily for drilling cast iron, the point angle will be greater than 90° up to a maximum of about 120°. Also, in such a drill the helix angle will preferably be between 35° and 40° and the rake angle will preferably be between 5° and 15°. On the other hand, in a drill intended primarily for the drilling of low and medium alloy carbon steel the point angle will preferably be between 110° and 125°, the helix angle will preferably be between 30° and 40° and the rake angle will preferably be between 10° and 20°. In a drill intended primarily for the drilling of aluminum, the point angle will preferably be between 100° and 130°, the helix angle will preferably be between 35° and 45°, and the rake angle will preferably be between 15° and 20°.

In order that the invention may be fully understood and readily carried into effect, the same will now be described, by way of example only, with reference to the accompanying drawings, of which:

Figure 1:
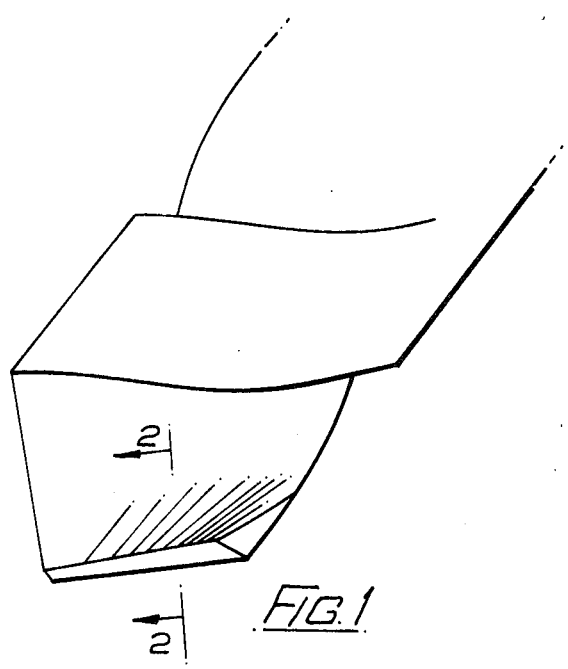
FIG. 1 is a perspective view of an end portion of a conventional twist drill.
Figure 2:
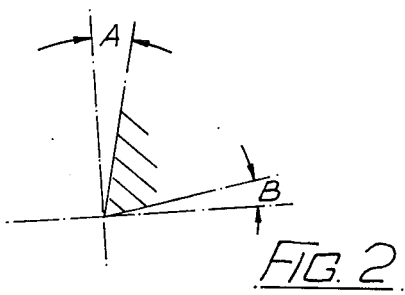
FIG. 2 is a scrap sectional view on the line 2—2 in FIG. 1.

Referring now to FIGS. 1 and 2 of the drawings, in a conventional twist drill the lip rake A varies along the length of each cutting edge, that is to say, the angle of the drill varies in directions normal to the cutting edges. (This will be understood when it is considered that at any transverse section through the fluted form of the drill the axial rake varies from a maximum at the periphery of the drill, where of course it is equal to the helix angle, to a minimum adjacent the root of the drill. The fact that the lip rake is measured normal to the cutting edges modifies this degree of variation but it is still very pronounced as indicated by the shade lines in FIG. 1). The clearance angle B is applied by grinding and is constant along the length of each cutting edge. Thus it will be seen that the included angle of each cutting edge also varies considerably along its length and since this angle is a measure of the strength of the cutting edge and its capability of dissipating heat it will be understood that the cutting edge is very much weaker at the outer periphery of the drill even though this is the part of the cutting edge which does the most work.

Figure 3:
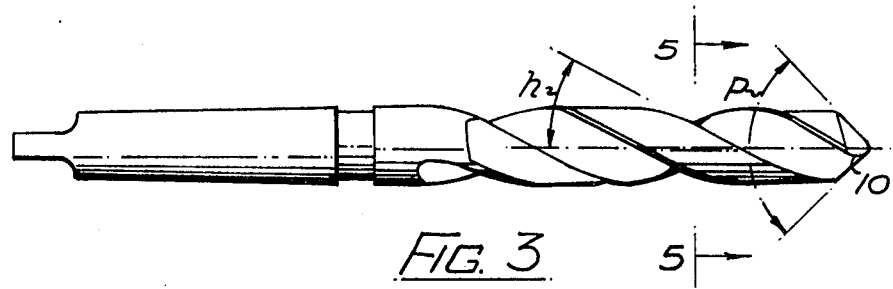
FIG. 3 is a side view of a twist drill embodying the invention.
Figure 4:
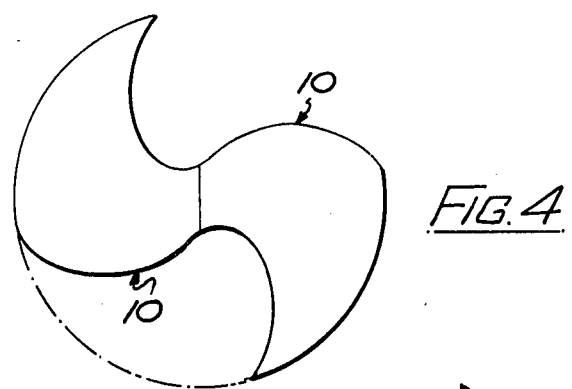
FIG. 4 is a view of the sharpened end of the drill, drawn to a somewhat enlarged scale.
Figure 5:
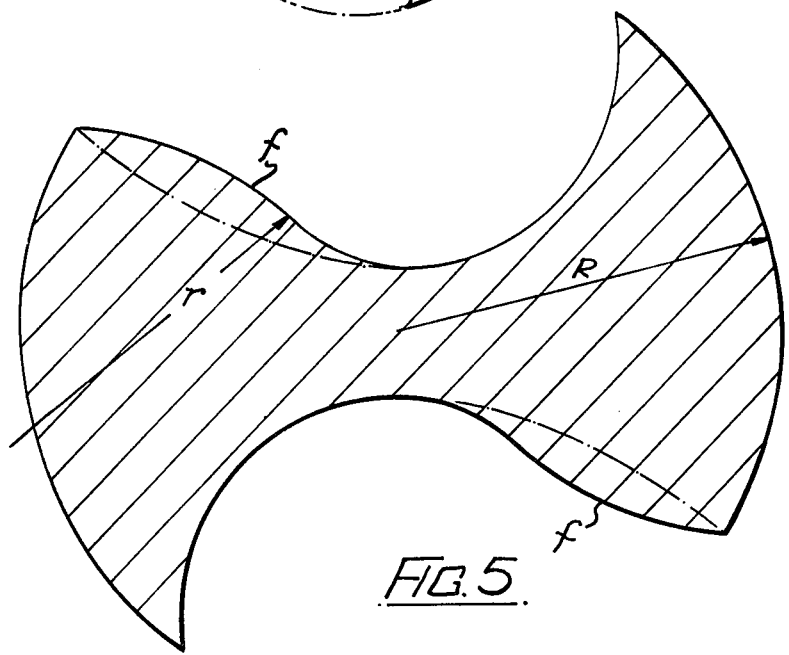
FIG. 5 is a cross-sectional view on the line 5—5 in FIG. 3, drawn to an even larger scale, a typical cross-sectional shape of a conventional drill being superimposed thereon in chain-dotted lines.

Referring now to FIGS. 3 to 5 of the drawings, the twist drill there illustrated (which is intended primarily for drilling cast iron) has a conventional helix angle $h$ of about 35°, and has been sharpened at a conventional point angle P in the region of 90°. However, although the cutting edges 10 are contained in the surface of an imaginary cone, they are curved as can be seen in FIG. 4 and this has been brought about by the special shape of the cross-section of the drill.

The cross-sectional shape of the drill is shown in FIG. 5 and it will be seen that whereas in a conventional drill the curves contained in the drill faces $f$ in planes transverse to the drill axis are concave, these same portions of the cross-section of a drill embodying the present invention are convex. The convex curve is such that along the length of each cutting edge the lip rake is substantially constant and the exact form which the convex curve should have to fulfil this requirement can be determined for any desired combination of helix angle, point angle and lip rake required.

It has been found that not only does the relationship between this unconventional cross-sectional drill shape and the conventional helix angle and point angle produce the curved cutting edge referred to above and the substantially constant lip rake along the length of each cutting edge, but that in the region of the outer corner of each cutting edge the usual weak zone has been strengthened so that the heat generated at that point has been more easily dissipated. The fact that wear has been more evenly distributed along the cutting edges and that high concentrations of stress in the regions of the outer corners have been avoided, has resulted in greatly extended drill life between re-grinds. It will be understood that since the drill can be resharpened in what may be termed a conventional manner to achieve this unconventional form, that is to say without the use of a special grinding wheel or special purpose machine, it is a very great advance on any previously known form of twist drill. It will also be understood that since the advantage of extended cutting edge life has been obtained without the need to reduce the point angle unduly the strength of the drill in the region of its chisel edge has been maintained without the need to provide a compound point angle thus avoiding unnecessary expense and complication each time the drill is re-ground.

It has been pointed out above that the exact form required of the convex curves in the cross-section of the drill can be determined for any desired combination of helix angle, point angle and lip rake so that the lip rake is substantially constant along the length of each cutting edge (radially outwards of the core portion of the drill that is). However, it has been found by trial and experiment that in a drill having a conventional helix angle, that is to say between 30° and 45°, and exhibiting the advantages referred to above, the convex curvature has substantially conformed to a radius $r$ of between 0.9 and 1.2 drill radius R.

It is of course possible to vary the point angle, helix angle and lip rake angle to suit the workpiece material for which the drill is primarily intended, that is to say by trial and experiment to choose the exact convex cross-sectional curvatures required in the surfaces of the drill faces so that, the helix angle having been selected initially and the point angle having been applied by grinding the lip rake angle is substantially constant along the length of each cutting edge. Consequently, by trial and experiment it has been found that for optimum results when drilling cast iron the point angle should preferably be between 90° and 120°, the helix angle should preferably be between 35° and 40° and the rake angle (along what is the portion of substantially constant angle, that is to say radially outwards of the core portion of the drill) should preferably be between 5° and 15°. It has been found that for optimum results when drilling low and medium alloy carbon steel the point angle should preferably be between 110° and 125°, the helix angle should preferably be between 30° and 40° and the rake angle should preferably be between 10° and 20°. For optimum results when drilling aluminum, the point angle should preferably be between 100° and 130°, the helix angle should preferably be between 35° and 45° and the rake angle should preferably be between 15° and 20°.

It should of course be understood that the above figures are given by way of example only and that they are generalisations. It should also be understood that by trial and experiment, that is to say by the careful cross sectioning and measurement of a very wide range of drills produced according to the invention, it is possible to select a required cross-sectional shape, that is to say a cross-sectional shape with the exact convex curvature required in the surfaces of the drill faces, which will give the combination of angles selected to suit a selected work material. When the selected point angle is then applied, by a conventional grinding process, it will be found that the required lip rake angle is produced and that it is substantially constant along the length of each cutting edge.

What I claim and desire to secure by Letters Patent is:

1. A twist drill having a cross-sectional shape which is convex in the surfaces of the drill faces, the convexity being of such an extent that it conforms substantially to a radius of between 0.9 and 1.2 of the drill radius, the lip rake angle being substantially constant along the cutting edges radially outwards of the core portion of the drill, the helix angle being between 25° and 45°, and the point angle being between 90° and 150°, whereby the cutting edges are curved but contained in the surface of an imaginary cone so that the drill can be sharpened on a conventional machine.

2. A twist drill according to claim 1, intended primarily for drilling cast iron, the point angle being between 90° and 120°.

3. A twist drill according to claim 2, in which the helix angle is between 35° and 40° and the rake angle is between 5° and 15°.

4. A twist drill according to claim 1, intended primarily for the drilling of low and medium alloy carbon steel, the point angle being between 110° and 125°, the helix angle being between 30° and 40° and the rake angle being between 10° and 20°.

5. A twist drill according to claim 1, intended primarily for the drilling of aluminium, the point angle being between 100° and 130°, the helix angle being between 35° and 45°, and the rake angle being between 15° and 20°.

6. A twist drill according to claim 1 wherein the rake angle is between 10° and 20°.

* * * * *